United States Patent Office 3,408,175
Patented Oct. 29, 1968

3,408,175
HERBICIDAL PROCESS

Theodore R. Schuh, Jr., North Riverside, Ill., assignor to Nalco Chemical Company, Chicago, Ill., a corporation of Delaware No Drawing. Continuation-in-part of application Ser. No. 370,692, May 27, 1964. This application Apr. 19, 1967, Ser. No. 631,907

2 Claims. (Cl. 71—65)

ABSTRACT OF THE DISCLOSURE

This invention relates to a method of spraying oil solutions of herbicidal liquids in the presence of certain polymers whereby the misting and drifting tendencies of these liquids are reduced.

This application is a continuation-in-part of my earlier filed application, Ser. No. 370,692, filed May 27, 1964, now abandoned.

The use of herbicides to control and inhibit undesirable weed growth is well-known and of widespread usage in the agricultural, industrial, and domestic fields. Roadsides, embankments, railway right-of-ways, and other earth surfaces are often subjected to treatment with toxic chemicals, organic and inorganic. Numerous compounds with widely variant functionalities are effective to a greater or lesser degree in inhibiting or destroying the growth of undesirable vegetation.

Noxious plants or weeds which interfere with human operations broadly include broad leaf plants and grasses. Herbicides have been tailored to destroy or inhibit the growth both of these or a single group. In some instances, mixtures of herbicidally active components are employed to combat various species of pervasive type plants.

One of the most widely used techniques in eradicating undesirable weed growth is accomplished by spraying the herbicidally active chemical upon the area within which the plants are growing. In some instances, pre-emergence spraying is carried out. That is, suspected areas of weed growth are sprayed in early spring or late fall to prevent even an appearance of noxious plants or at the least to severely weaken their growth paterns. One of the most effective ways of carrying out a weed control program is spraying the area under control from moving vehicles. As just one example, it is common practice to spray railway right-of-ways from a moving train.

Certain problems arise in connection with a herbicidal spray program. First, and foremost, is the problem of misting or fogging which generally begins to occur at a spray pressure of 15 p.s.i. and worsens as spray pressures are increased. The herbicidal spray tends to drift and many valuable crops can be destroyed or damaged to varying degrees. In some instances, due to extreme toxicity of certain herbicides, even valuable animal life such as livestock can be injured. The problem of drift has become more widespread in recent years, due to both the more extensive use of herbicides, as well as application of these herbicides as concentrated solutions in low volumes per acre.

Generally, undesirable drift from spraying of herbicidal solutions may occur in two ways. First, spray drift may occur as a result of the smaller droplets in the spray being carried away from the target by wind or convection currents. Second, the vapor from a volatile herbicide may be carried away from the target area during or after the spraying in a type of phenomenon called vapor drift. This is most likely to occur in hot weather and can take place even in the absence of wind.

Efforts to substantially reduce spray and vapor drift have in the past generally been unsuccessful or impractical. To minimize drift, spraying may be carried out only on days when there is negligible air movement. Such practice is impractical and substantially inhibits overall efficiency of a herbicidal control program. Likewise, efforts to reduce undesirable misting or fogging by specific design of nozzles has met with only limited success, and even in such cases requires an impractical sophisticated mechanical design. Lowering the spray pressure does aid to some degree in preventing drift. However, sound economics of a herbicidal spraying operation consistent with good wed control do not allow too great a reduction in spray pressures.

It would therefore be a considerable advance in the herbicidal art if a new and novel method of spraying herbicidally active chemicals was devised, whereby undesirable drift was substantially reduced or even done away with entirely as a problem. If a stream of herbicide chemical could be sprayed from solution form on exact target without substantial misting or fogging simultaneously taking place, considerable benefits would accrue. Particularly, desirable animal and plant life could be preserved without any decrease in efficiency of eradicating noxious vegetation. Moreover, if such method could be carried out without sacrificing operational speed of present herbicidal spray methods, widespread use of such an improved process would be feasible. Specifically, if spray techniques could be carried out at relatively high pressures without fear of misting or fogging, it would be a valuable tool to the overall field of herbicide control. Lastly, if the problem of misting or fogging were done away with in spraying herbicides dissolved or dispersed in an oil carrier, such process would become widely adapted in any conventional herbicide spray program.

It therefore becomes an object of the invention to provide an improved method of inhibiting the growth and reproduction of noxious plants by spraying herbicidal liquids within the area to be controlled.

Another object of the invention is to provide an improved method of spraying herbicidal liquids whereby misting or fogging tendencies of these liquids are substantially reduced.

A specific object of the invention is to provide an improved method of spraying herbicidal liquid oil concentrates such as hydrocarbon-based herbicides, whereby spray misting is substantially inhibited.

Other objects will appear hereinafter.

In accordance with the invention an improved method of controlling the growth of undesirable vegetation has been discovered. In its broadest aspect this invention is involved with modification of the conventional process of spraying with an oil solution containing a herbicidal component. The improvement of this process which constitutes the gist of the invention comprises spraying a herbicidal oil solution in presence of a specific group of polymers which are soluble in the herbicidally active oil solution in at least use dosages. Under such conditions the misting tendencies of the herbicide liquid when sprayed are substantially reduced. Spray or vapor drift which normally occurs during a high pressure spray operation is substantially reduced, and in some instances completely obviated.

An important concept of the invention is to carry out the primary object of reducing misting or fogging of spray solutions by appropriate incorporation of polymer reagent, but without substantially increasing the viscosity of the oil solution after polymer dissolution. It has been discovered that this can be accomplished in the practices of the instant invention, since only relatively minute amounts of polymer need be present to accomplish the object of mist or fog control. If the viscosity of the polymer treated herbicidal liquid is markedly increased, several drawbacks are inherently present. First, undesirable plugging of herbicidal solution in spray nozzles may occur. Also, substantial viscosity increases of a treated herbicidal liquid would cause severe pumping problems. Another deficiency in use of viscous herbicidal concentrates would be a marked decrease in volume of spray solution per unit of time which can be efficiently sprayed upon the situs to be controlled. Other drawbacks in application of a viscous solution via spray techniques will be apparent to those skilled in the art. It is thus a primary achievement in the invention to be able to carry out the anti-misting or anti-fogging control with relatively no increase in solution viscosity of herbicide-oil solutions.

The process of the invention may be carried out via a wide variety of different techniques. For example, the polymer may be interdispersed with the spray from a separate polymer source during the actual spraying operation itself. Likewise, the polymer treating agent may be combined with the herbicidal liquid at the initial point of spraying by introducing the polymer into the spray nozzle or even the nozzle orifice from some outside reservoir. The most practical method of incorporation of polymer into herbicidal solution involves a treatment of the solution prior to the actual spray step. The polymer is preferably dissolved in the herbicidal solution and homogeneously dispersed throughout by conventional mixing techniques. This may be accomplished at any time prior to spray breakdown of the herbicidal solution phase into actual spray droplets. One convenient method is to dissolve the polymer into the herbicidal solution just immediately before application. For example, the actual mixing operation may be effected upon a moving vehicle such as a railroad car which is used to spray the particular area to be controlled.

It is understood, of course, that the herbicidal process of the invention may be carried out by either spraying undesirable vegetation while in growth stage or spraying the ground prior to plant emergence.

Depending upon the nature of the polymer, its molecular configuration, molecular weight, etc., use dosages may be varied over a considerable range. It is preferred that the viscosity of a primarily hydrophobic or oil-based herbicidal liquid not be increased more than 100 centipoises after addition of polymer. The dosages of polymer can be therefore adjusted within these limits. Excessive dosages of high molecular weight polymer have the tendency in most instances to increase the viscosity beyond the stage range, and should be avoided. With the above points in mind, generally in the most preferred practice of the invention, from about 10 to about 3000 p.p.m. of high molecular weight polymer are added to the herbicidal liquid. Within this range, misting or fogging is at the very minimum substantially reduced. In some instances such undesirable phenomenon has been completely corrected. The target of the herbicidal oil solution thus reaps the exclusive benefit of herbicidal control without undesirable side effects of injury to crops and desirable plant species. Likewise, for of injury to animals who may feed upon herbicidally contacted non-target vegetation may be done way with by following the thus described invention.

The anti-misting polymers may be added to any type of oil solution containing a wide variety of herbicidally active chemicals. By the term "oil solution" is meant a herbicidal liquid containing a hydrocarbon constituent as the primary component, and includes water-in-oil emulsions. Such oil solutions normally contain at least 50% by weight of oil and more often 60% by weight. If such a system is to be treated with an anti-fogging polymer, it is again greatly preferred that the polymer be soluble in the oil or hydrocarbon phase to achieve best results. The oil-based herbicidal liquid may contain minor amounts of other solvents or additives such as organic solvents, for example, alcohols, ketones, esters, etc. Emulsifying agents, surface-active chemicals, dispersing aids, etc., may also form a portion of the herbicidal solution. For example, detergent-type wetting agents may be employed, as for example, those described in the article entitled, "Detergents and Emulsifiers," by John W. McCutcheon, 1963.

Oil-containing herbicidal solutions such as straight oil solutions, and water-in-oil emulsions, may be composed of a variety of hydrocarbons or petroleum products such as kerosene, mineral oil, naphthas, gas oils, crude oil, light distillates, etc. In many instances the hydrocarbon oil carrier for the herbicide is itself phytotoxic in nature. In particular, it has been found that those hydrocarbons that are best suited to provide oil-based herbicidal concentrates, which may be subsequently treated with anti-misting polymer, are hydrocarbon oils which may be generically classified as "aromatic petroleum hydrocarbon solvents." Specifically, this type of solvent class includes those particular petroleum type solvents which contain at least 5% by weight of aromatic components and most preferably, 50% by weight or more. Examples of solvents of this type are listed in Table I below. For convenience, the specifications of these typical industrial aromatic type oils are included.

TABLE I

| Specifications | A | B | C | D | E | F | G | H |
|---|---|---|---|---|---|---|---|---|
| Specific Gravity at 60° F | 0.899 | 0.895 | 0.899 | 0.931 | 0.947 | 0.987 | 0.934 | 0.9279 |
| Flash Point PMCC (° F.) | 215 | 280 | 215 | 210 | 250 | 220 | 200 | |
| Aromatics and Olefins (percent) | 45–48 | 11.7 | 53 | 83 | 70 | | 64 | 85 |
| Color ASTM | 1.5 | | | 5.0 | (¹) | | | (²) |
| Aniline Point, ° F | 117 | (³) | | (⁴) | 88 | (⁵) | | 78 |
| Pour Point, ° F | −5 | −30 | | | | | | |
| Sulfur (percent) | 0.8 | | 1.6 | 0.7 | | | | |
| Viscosity S.U. at 100° F | 36 | 58 | | | 42 | 36 | 36 | |
| ASTM Distillation: | | | | | | | | |
| I.B.P., ° F | 430 | 518 | 440 | 430 | 488 | 454 | 460 | 340 |
| 10% Recovered | 485 | 564 | 500–520 | 445 | | 478 | 470 | 363 |
| 50% Recovered | 525 | 614 | 530–560 | 463 | | 510 | 510 | 446 |
| 90% Recovered | 587 | 680 | 585–610 | 497 | | 600 | | 500 |
| End Point | 620 | 725 | 640 | 540 | 748 | 650 | 730 | 532 |
| Pentachloro phenol solution at 40° F. (percent) | 12.5 | 10.0 | 12.5 | 15.0 | 12.5 | 15.0 | 15.0 | |

¹ Green.   ² Pale amber.   ³ 60.8° C.   ⁴ Mixed 26° F.   ⁵ Mixed 66° F.

The most effective oil-based herbicidal liquids which may be treated in the instant invention contain oils which have an aromatic content of at least 50% and more preferably from 70 to 85% by weight.

The invention is adaptable to spraying a vast number of known herbicides which are soluble, dispersible, or emulsifiable in oils such as hydrocarbon solvents or water-in-oil emulsions. Specific herbicidal liquid concentrates which may be sprayed in the presence of high molecular weight polymer include the following representative herbicide classes; such substituted uracils as 5-bromo-3-sec. butyl-methyl uracil; such aryl alkyl urea herbicides as 1-phenyl-3-methylurea,
1-(3-chloro-4-methoxyphenyl)-3,3-dimethylurea,
1-(3-chlorophenyl)-3,3-dimethylurea,
1-(3,4-dichlorophenyl)-3,3-dimethylurea,
and 1-phenyl-3,3-dimethylurea;

acidic herbicides such as 2,4-dichlorophenoxyacetic acid,
2-methyl-4-chlorophenoxyacetic acid,
2,4,5-trichlorophenoxyacetic acid,
3,4-dichlorophenoxyacetic acid,
4-chlorophenoxyacetic acid,
2-(2,4-dichlorophenoxy)propionic acid,
2-(2-methyl-4-chlorophenoxy)propionic acid,
2-(2,4,5-trichlorophenoxy)propionic acid,
2-(3,4-dichlorophenoxy)propionic acid,
2-(4-chlorophenoxy)propionic acid,
4-(2,4-dichlorophenoxy)butyric acid,
4-(2-methyl-4-chlorophenoxy)butyric acid,
4-(2,4,5-trichlorophenoxy)butyric acid,
4-(3,4-dichlorophenoxy)butyric acid,
4-(4-chlorophenoxy)butyric acid,
trichloroacetic acid,
2,2-dichloropropionic acid,
2,2,3-trichloropropionic acid,
2,3,6-trichlorobenzoic acid,
2,3,5,6-tetrachlorobenzoic acid,
N-1-naphthylphthalamic acid,
3,6-endoxohexahydrophthalic acid, isopropyl xanthic acid, monomethylarsonic acid, polychlorobenzoic acid, such substituted picolinic acids as 4-amino 3,5,6-trichloro picolinic acid and pentachloropentadienoic acid; salts, esters, amides of any of the foregoing herbicidal acids or other compounds; maleic hydrazide and its herbicidal derivatives; polychlorophenols (3 to 5 chlorine atoms) and their alkaline salts; sulfamic acid and its salts; alkaline salts of cyanic acid; alkaline salts of thiocyanic acid; alakaline salts of arsenous and arsenic acids; sodium borates; sodium or calcium cyanamide; phenyl mercury salts (acetate, oleate, formate, lactate, chloride, phosphate, and the like); isopropyl esters of phenyl- and chlorophenylacarbamic acids; 1,2,4-trichlorobenzene; dinitrophenols (dinitro-o-cresol and dinitro-o-sec-butyl-phenol) and their salts; boron trifluoride amine complexes; amino substituted s-triazines such as 2-chloro-4,6-bis(ethylamino)-s-triazine, 2-chloro-4, ethylamino-6, isopropylamino-s-triazine, 2 - methoxy-4,6-bis(isopropylamino)-s-triazine, 2-chloro-4, 6-bis(diethylamino)-s-triazine, etc., and various combinations of the just mentioned herbicides and others.

As mentioned above, when liquid oil concentrates of herbicides or water-in-oil emulsions are to be treated, it is greatly preferred that the polymeric anti-fogging agent be soluble in the oil component. It is therefore preferable that the polymer be hydrophobic in character. The oil-soluble polymers have a molecular weight of at least 25,000. Preferred polymers have a molecular weight in excess of 100,000.

It has been discovered that the polymers which have been shown the greatest measure of success have a linear hydrocarbon structure derived from an ethylenically unsaturated monomer containing 2–5 carbon atoms. These monomers may contain one or two unsaturated groups. Among these, polyethylene, polypropylene, polyisobutylene, polybutadiene, polyisoprene and copolymers of the foregoing have shown the most promise. Polyisobutylene and polyisoprene (natural rubber) are the most preferred of this group.

By the term "soluble," as applied to the property of the polymer of the invention of being able to be incorporated into herbicide or other solutions, is meant the ability of being solubilized or dispersed in at least use amounts in the liquid being treated.

It is not totally understood how the just mentioned polymers aid in substantially reducing misting or fogging of sprayed solutions even when applied in relatively minute amounts. Without polymer present during a spraying operation a pressure drop occurs in which excess energy present actually fractures the liquids into mist or fog. When the polymer is added to the sprayed solution it is believed a visco-elastic effect takes place. That is to say, the polymer-treated liquid actually is deformed in a visco-elastic manner which allows the energy from the pressure drop to fracture the liquid in a more uniform manner, and prevent formation of very small droplets. This occurs rather than the spray breaking up into a mist pattern. In essence, shock or energy is taken up by a polymer-treated liquid in contradistinction to an untreated solution which is incapable of resisting the shock or energy without substantially changing its rheological characteristics.

It was noted that in spraying polymer treated herbicidal solutions a variety of advantages other than mist reduction are present. For example, uniformity of spray pattern as well as droplet size is achieved. In addition, due to concentration of spray, pressure at point of impact is increased.

In order to determine the efficiency of the invention, certain spray tests were run. In a series of tests a high aromatic content oil which is generally used as a phytotoxic carrier for other herbicides was sprayed. Considerable drift was noted without benefit of polymer additive treatment. When a high molecular weight polyisobutylene (molecular weight=approximately 350,000) was added to the oil in a dosage amount of 400 p.p.m., a considerable reduction of misting of the oil system was noted.

The following examples further illustrate the utility of the invention.

EXAMPLE I

A herbicidal oil solution was made up containing the following described components. The oil was itself phytotoxic in nature and contained approximately 45% aromatics. Into this oil was dissolved 1.9% of the propylene glycol butyl ether ester of trichlorophenoxy acetic acid. This particular herbicidal oil solution was tested in a field application, and specifically, sprayed upon dormant brush growing along a roadside. Without benefit of polymer treatment, it was noted that the spray blew in a wide pattern, and even across the entire road width.

With incorporation of approximately 400 p.p.m. of a polyisobutylene polymer having a molecular weight of approximately 350,000, a thus treated oil solution containing the above herbicide components was sprayed in a comparative application. In this instance a definite reduction in drift was noted and at no time did the spray blow any appreciable distance.

EXAMPLE II

Into the oil described in Example I was dissolved 3.4% of the isooctyl ester of 2(2,4,5-trichlorophenoxy)propionic acid herbicide. This oil solution was again sprayed with and without benefit of polyisobutylene (molecular weight=300,000; 400 p.p.m. treatment level). The same results were noted as set out in Example I.

The above examples are intended to illustrate the process of the invention, and are not intended to be limitative thereof. Other modifications and variations of the invention will be apparent to those skilled in the art.

The invention is hereby claimed as follows:
1. A method of controlling the growth of undesirable vegetation which comprises the step of spraying an oil solution which contains:

(a) A phytotoxic amount of a herbicide, and (b) dissolved therein at least 10 parts per million but yet a substantially nonviscosity increasing amount of a linear polymer which has a molecular weight of at least 25,000 and is selected from the group consisting of homopolymers and copolymers of ethylene, propylene, isobutylene, butadiene and isoprene, said liquid being characterized as having reduced misting tendencies when sprayed.

2. The method of claim 1 wherein the said polymer is selected from the group consisting of polyisoprene and polyisobutylene and has a molecular weight of at least 100,000.

References Cited

UNITED STATES PATENTS

| | | | |
|---|---|---|---|
| 2,652,322 | 9/1953 | Hedrick et al. | 71—2.7 |
| 3,045,394 | 7/1962 | Coulter | 71—2.1 X |
| 3,060,084 | 10/1962 | Littler | 71—2.2 X |
| 3,067,089 | 12/1962 | Winslow | 167—42 |
| 3,131,119 | 4/1964 | Fordyce | 167—22 |
| 3,158,535 | 11/1964 | Beerbouer et al. | 167—42 |
| 3,175,898 | 3/1965 | Seymour et al. | 71—2.7 |
| 3,235,366 | 2/1966 | Seymour et al. | 71—2.6 |

JAMES O. THOMAS, Jr., *Primary Examiner.*